US008965298B2

(12) United States Patent
Piazza et al.

(10) Patent No.: US 8,965,298 B2
(45) Date of Patent: Feb. 24, 2015

(54) ESTABLISHING COMMUNICATION BETWEEN DEVICES

(75) Inventors: Kevin Piazza, Santa Ana, CA (US); Don Hideyasu Matsubayashi, Tustin, CA (US); Hung Khei Huang, Irvine, CA (US); Dariusz Dusberger, Irvine, CA (US)

(73) Assignee: Canon Kabushiki Kaisha, Tokyo (JP)

( * ) Notice: Subject to any disclaimer, the term of this patent is extended or adjusted under 35 U.S.C. 154(b) by 101 days.

(21) Appl. No.: 12/890,287

(22) Filed: Sep. 24, 2010

(65) Prior Publication Data

US 2012/0077442 A1    Mar. 29, 2012

(51) Int. Cl.
*H04W 76/02* (2009.01)
*H04W 8/00* (2009.01)
*H04W 8/22* (2009.01)
*H04W 84/18* (2009.01)

(52) U.S. Cl.
CPC ............... *H04W 8/005* (2013.01); *H04W 8/22* (2013.01); *H04W 76/023* (2013.01); *H04W 84/18* (2013.01)
USPC .......................... 455/67.11; 709/220; 370/255

(58) Field of Classification Search
CPC ... H04L 29/06; H04L 69/08; H04L 29/06027; H04L 69/18; H04L 69/24; H04L 67/14; H04L 65/1069; H04L 41/0806; H04L 41/0886; H04L 67/141; H04W 80/00; H04W 8/005; H04W 84/18; H04W 28/18; H04W 88/06; H04W 76/02; H04W 76/023; H04W 8/22; H04W 40/246; H04W 40/24
USPC ................................ 455/67.11; 709/220, 221
See application file for complete search history.

(56) References Cited

U.S. PATENT DOCUMENTS

| 7,747,279 B2 * | 6/2010 | Hoddie ......................... 455/557 |
| 2004/0139180 A1 * | 7/2004 | White et al. .................. 709/221 |

(Continued)

FOREIGN PATENT DOCUMENTS

| CN | 1455570 A | 11/2003 |
| CN | 101120334 A | 2/2008 |

(Continued)

OTHER PUBLICATIONS

ConnectionManager:2 Service Template Version 1.01 for UPnP™ Version 1.0, May 31, 2006, located at http://www.upnp.org/specs/av/UPnP-av-ConnectionManager-v2-Service-20060531.pdf.*
MediaServer:2 Device Template Version 1.01 for UPnPTM Version 1.0, May 31, 2006, located at http://upnp.org/specs/av/UPnP-av-MediaServer-v2-Device.pdf.*

*Primary Examiner* — Gennadiy Tsvey
(74) *Attorney, Agent, or Firm* — Canon U.S.A., Inc. IP Division (57) ABSTRACT

A method for establishing communication between a plurality of devices, including obtaining communication protocols that the plurality of devices support, determining which of the communication protocols are common to each the plurality of devices, determining operational parameters that are associated with each of the common communication protocols, indicating which of the common communication protocols and associated operational parameters can be used to establish communication between the plurality of devices, determining whether the plurality of devices can communicate with each other using the common communication protocols, and establishing communication between the plurality of devices using at least one of the common communication protocols.

15 Claims, 8 Drawing Sheets

(56) References Cited

U.S. PATENT DOCUMENTS

| | | | |
|---|---|---|---|
| 2004/0204071 A1* | 10/2004 | Bahl et al. | 455/557 |
| 2005/0221858 A1 | 10/2005 | Hoddie | |
| 2006/0195884 A1* | 8/2006 | van Zoest et al. | 725/134 |
| 2006/0239452 A1* | 10/2006 | Jung et al. | 380/44 |
| 2008/0301267 A1* | 12/2008 | Chang et al. | 709/220 |
| 2009/0199001 A1* | 8/2009 | Barriga et al. | 713/171 |
| 2010/0138928 A1* | 6/2010 | Lee et al. | 726/26 |

FOREIGN PATENT DOCUMENTS

| | | |
|---|---|---|
| CN | 101132368 A | 2/2008 |
| CN | 101360059 A | 2/2009 |
| CN | 101427518 A | 5/2009 |
| CN | 101494558 A | 7/2009 |

* cited by examiner

ESTABLISHING COMMUNICATION BETWEEN DEVICES

BACKGROUND OF THE INVENTION

1. Field of the Invention

Aspects of the present invention relate to establishing communication between devices in order to facilitate data transfer between the devices.

2. Description of the Related Art

There exists a need today to transfer data from one device to at least one other device. In order for that transfer to occur, the two devices typically need to communicate with each other. Traditionally, in order to facilitate the data transfer, a direct logical connection (wired or wireless) needs to be established between the devices in question, the communication interfaces on each of the devices need to be configured in order for the devices to actually communicate with each other, and processes on each of the devices are executed to perform the data transfer.

With the advent and evolution of wireless communication technology, the process of data transfer between devices is becoming easier. More specifically, it is becoming easier to transfer the data directly between devices. However, there is still a need for human intervention to set-up the initial communication between the devices before any data transfer can occur. This set-up can include such things as setting the Service Set identifier (SSID) of a Wi-Fi network or the Bluetooth pairing key in one or more devices. The need for human intervention limits the flexibility and efficiency of connecting devices between which data is transferred.

Another drawback to current methods of connecting devices is the lack of being able to do so in an ad-hoc manner. Current methods require that the devices to be connected be on the same network. Thus, the ability to connect a device on one network with another device on different network is either non-existent or complicated.

In light of the above, what is needed is an approach to establishing communication between devices such that little or no human intervention is required and the connection can be established in ad-hoc manner.

SUMMARY OF THE INVENTION

According to an aspect of the invention, a method for establishing communication between a plurality of devices, the method including obtaining communication protocols available to the plurality of devices, determining communication protocols common to the plurality of devices, determining operational parameters associated with each of the common communication protocols for each of the plurality of devices, indicating the common communication protocols and associated operational parameters available to be used to establish communication between the plurality of devices, performing a device discovery operation using the common communication protocols and associated operational parameters, and establishing communication between the plurality of devices using at least one of the common communication protocols based on a result of the discovery operation.

DESCRIPTION OF THE EMBODIMENTS

Embodiments of the present invention provide for establishing communication between devices such that little or no human intervention is required and that the connection can be established in an ad-hoc manner.

Figure 1:
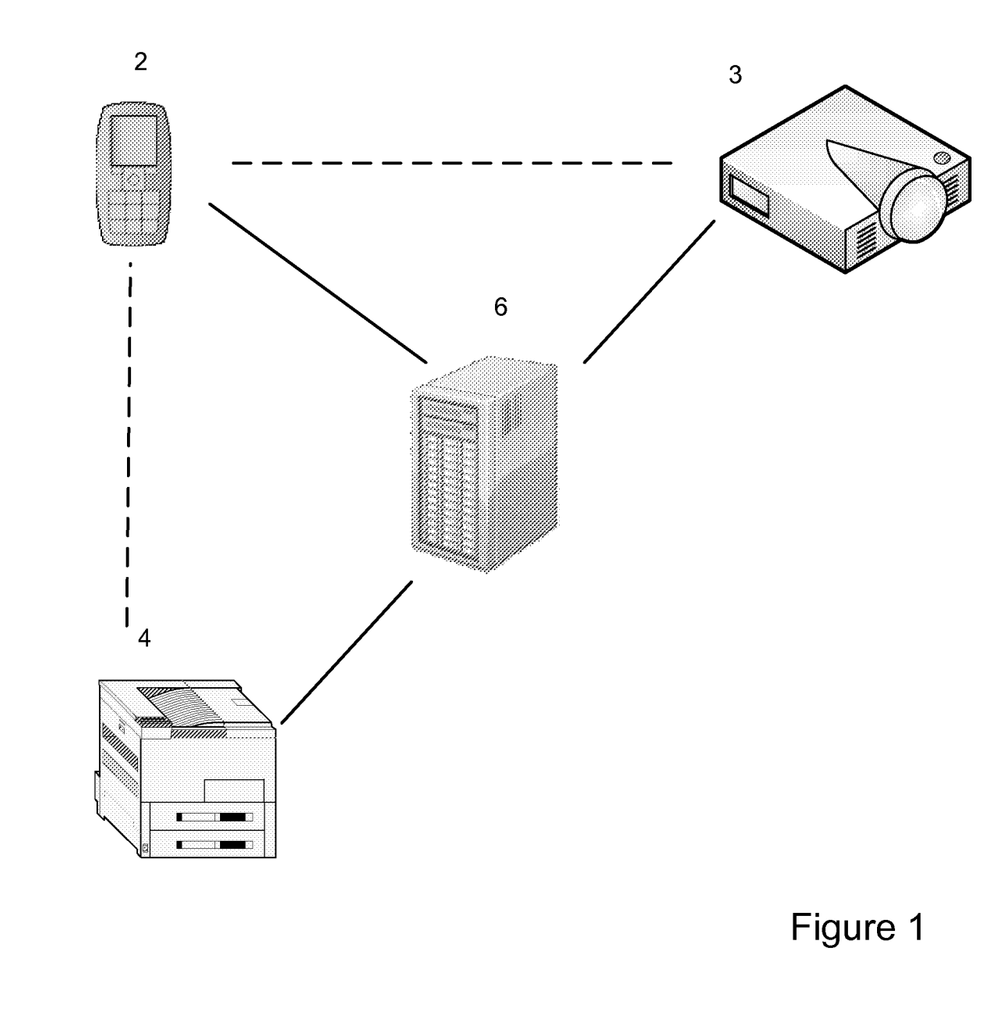
FIG. 1 is a representational view illustrating a general configuration of a system according to an exemplary embodiment of the invention.

FIG. 1 is a representational view illustrating a general configuration of a system according to an exemplary embodiment of the present invention. The system includes a central server 6, a smartphone 2, a projector 3, and printer 4. Smartphone 2, projector 3, printer 4 are connected to central server 6 via a local area network (LAN), wide area network (WAN), wireless local area network (WLAN), or any other type of communication interface that would enable practice of the present invention. Initially, smartphone 2 is not connected to/cannot communicate directly with projector 3 or printer 4.

Figure 2:
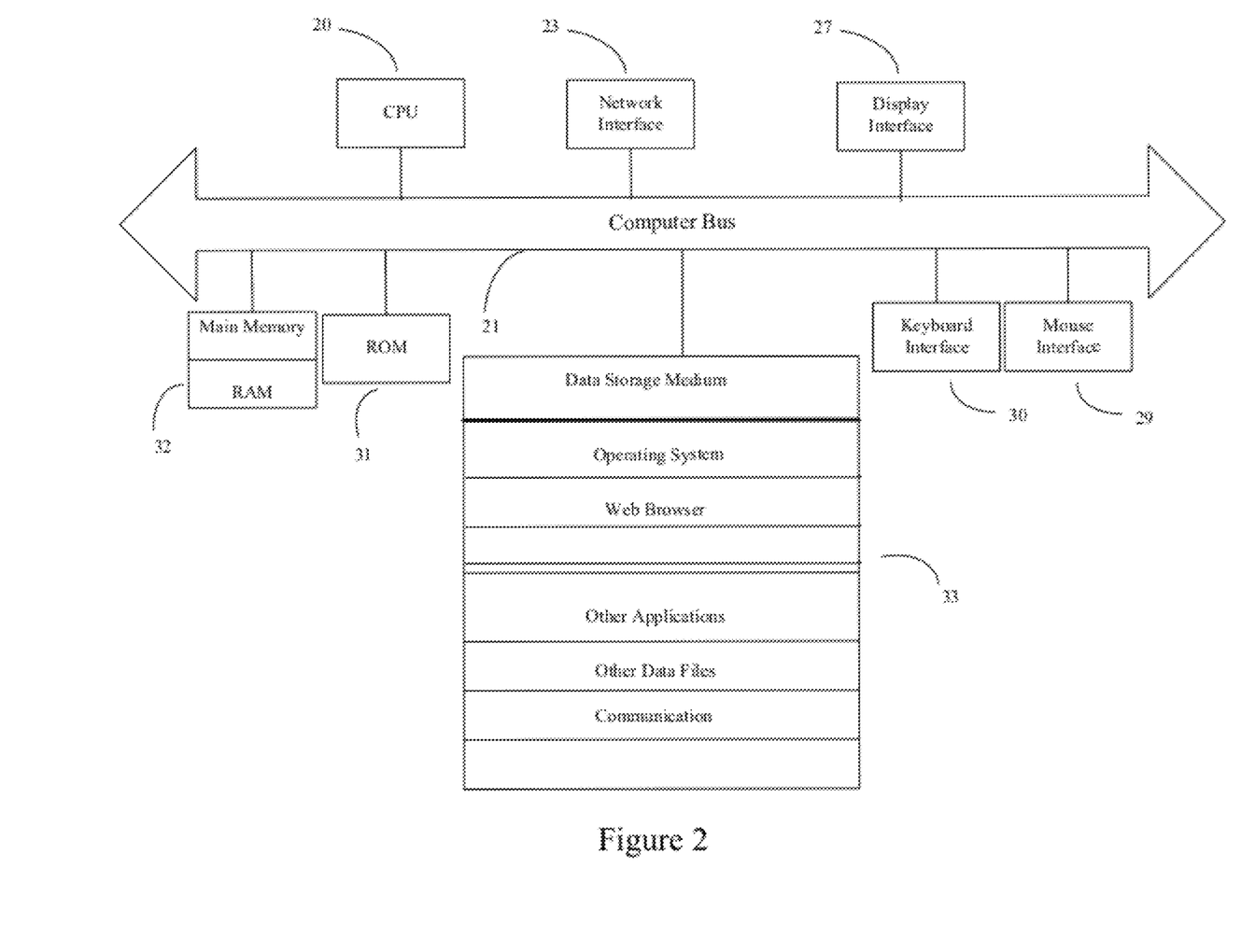
FIG. 2 is a block diagram illustrating an example of the internal architecture of a central device implementing a communication application according to an exemplary embodiment of the invention.

FIG. 2 is a block diagram illustrating an example of the internal architecture of central server 6. Shown in FIG. 2 is CPU 20, which can be any type of microprocessor, which interfaces to computer bus 21. Also interfacing with computer bus 21, network interface 23 enabling communication between the central server 6 and a network, display interface 27 for interfacing with a display monitor (not shown), keyboard interface 30 for interfacing with a keyboard (not shown), and mouse interface 29 for interfacing with a mouse (not shown).

Read only memory (ROM) 31 stores invariant computer-executable process steps for basic system functions such as basic I/O, start-up, or reception of keystrokes from a keyboard. Main random access memory (RAM) 32 provides CPU 20 with memory storage that can be accessed quickly.

Also shown in FIG. 2 is data storage medium 33, which includes an operating system, web browser, other applications, which may include word processing, spreadsheet, and graphics, and data files. Data storage medium 33 further includes communication application of the present invention. In the present embodiment, CPU 20 implements the communication application. However, any method for implementing the communication application that would enable practice of the present invention is applicable.

Figure 5:
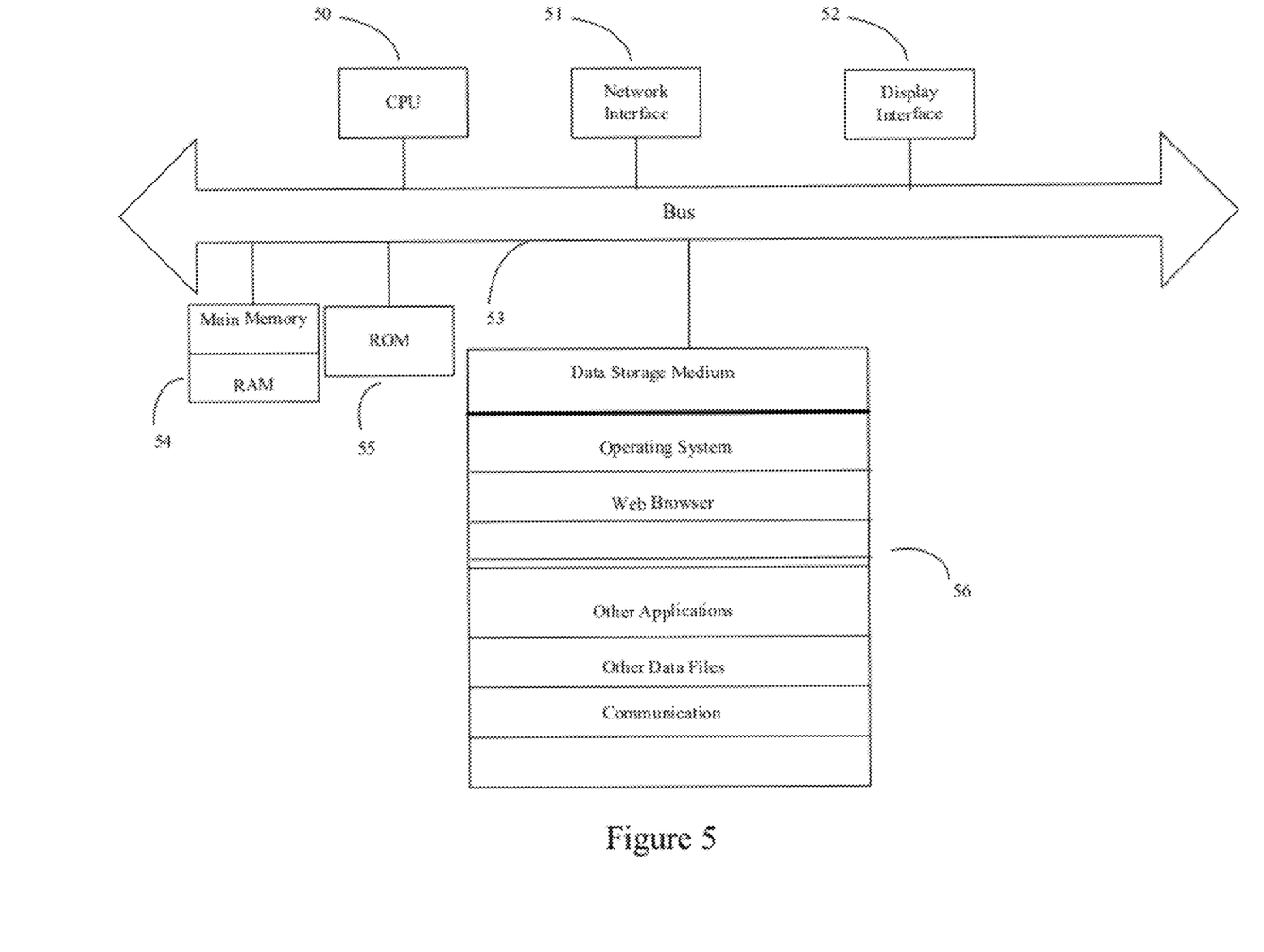
FIG. 5 is a block diagram illustrating an example of the internal architecture of a first device implementing a communication application according to an exemplary embodiment of the invention.

FIG. 5 is a block diagram illustrating an example of the internal architecture of smartphone 2. Shown in FIG. 5 is CPU 50, which can be any type of microprocessor, which interfaces to bus 53. Also interfacing with bus 53, network interface 51 enabling communication between smartphone 2 and a network, and display interface 52 for interfacing with a display of smartphone 2 (not shown).

Read only memory (ROM) 55 stores invariant computer-executable process steps for basic system functions such as basic I/O, start-up, etc. Main random access memory (RAM) 54 provides CPU 50 with memory storage that can be accessed quickly.

Also shown in FIG. 5 is data storage medium 56, which includes an operating system, web browser, other applications, and data files. Data storage medium 56 further includes the communication application of the present invention. In the present embodiment, CPU 50 implements the communication application. However, any method for implementing the communication application that would enable practice of the present invention is applicable.

Figure 6:
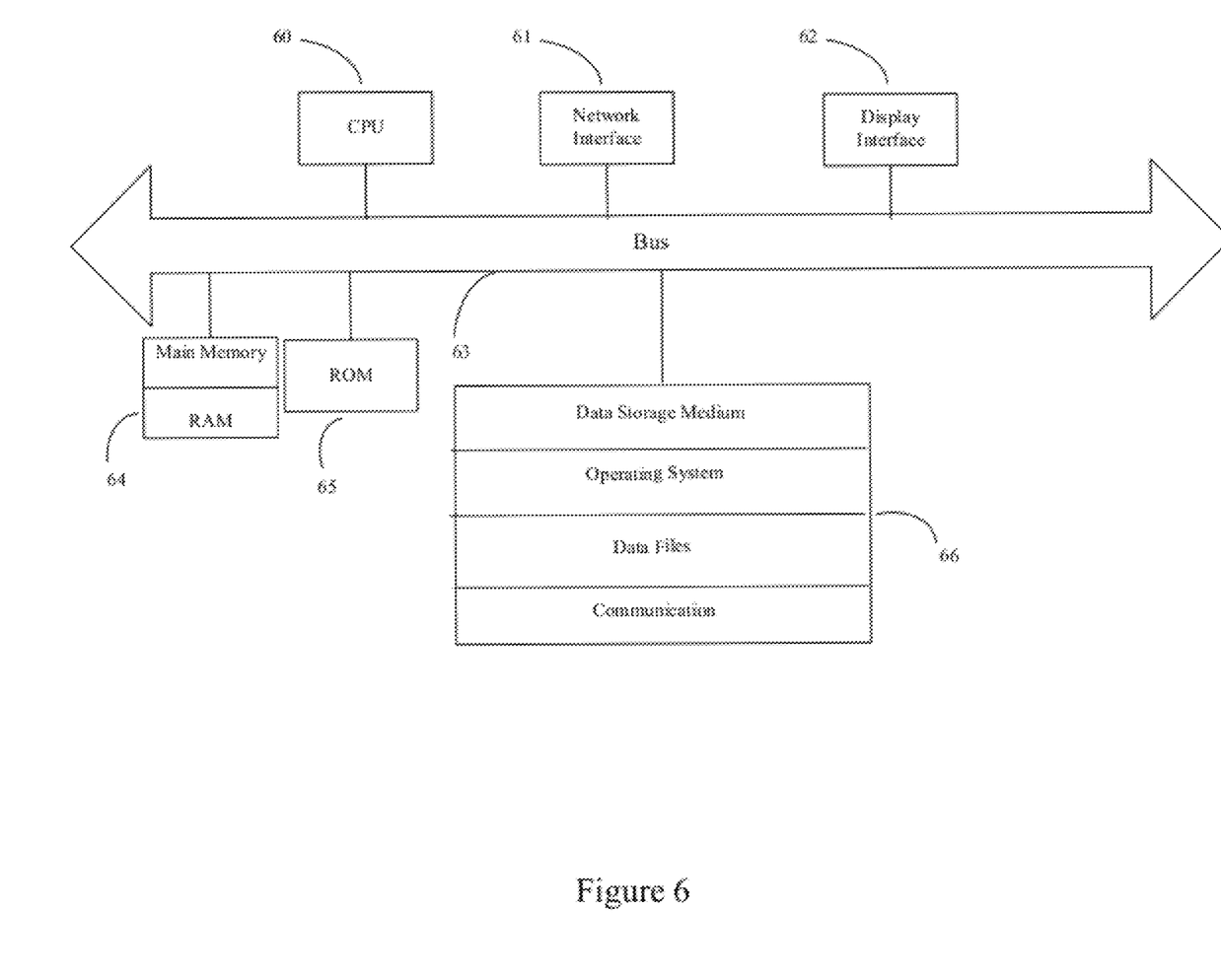
FIG. 6 is a block diagram illustrating an example of the internal architecture of a second device implementing a communication application according to an exemplary embodiment of the invention.

FIG. 6 is a block diagram illustrating an example of the internal architecture of projector 3. Shown in FIG. 6 is CPU 60, which can be any type of microprocessor, which interfaces to bus 63. Also interfacing with bus 63, network interface 61 that enables communication between projector 3 and a network, and display interface 62 for enabling projector 3 to display data via the projector's 3 lens (not shown).

Read only memory (ROM) 65 stores invariant computer-executable process steps for basic system functions such as basic I/O, start-up, etc. Main random access memory (RAM) 64 provides CPU 60 with memory storage that can be accessed quickly.

Also shown in FIG. 6 is data storage medium 66, which includes an operating system, data files, and the communication application of the present invention. In the present embodiment, CPU 50 implements the communication application. However, any method for implementing the communication application that would enable practice of the present invention is applicable.

FIGS. 3A-3B and 4A-4B are flowcharts of the communication application according to an exemplary embodiment of the present invention. Briefly, various devices register with a central server, wherein the devices attempt to discover each other in order to communicate with each other, and wherein after the central server determines the best method for the devices to communicate with each, the central server assists in establishing communication between the devices. For discussion purposes, the following description of an exemplary embodiment of the present invention will refer to establishing communication between smartphone 2 and projector 3.

Figure 3A:
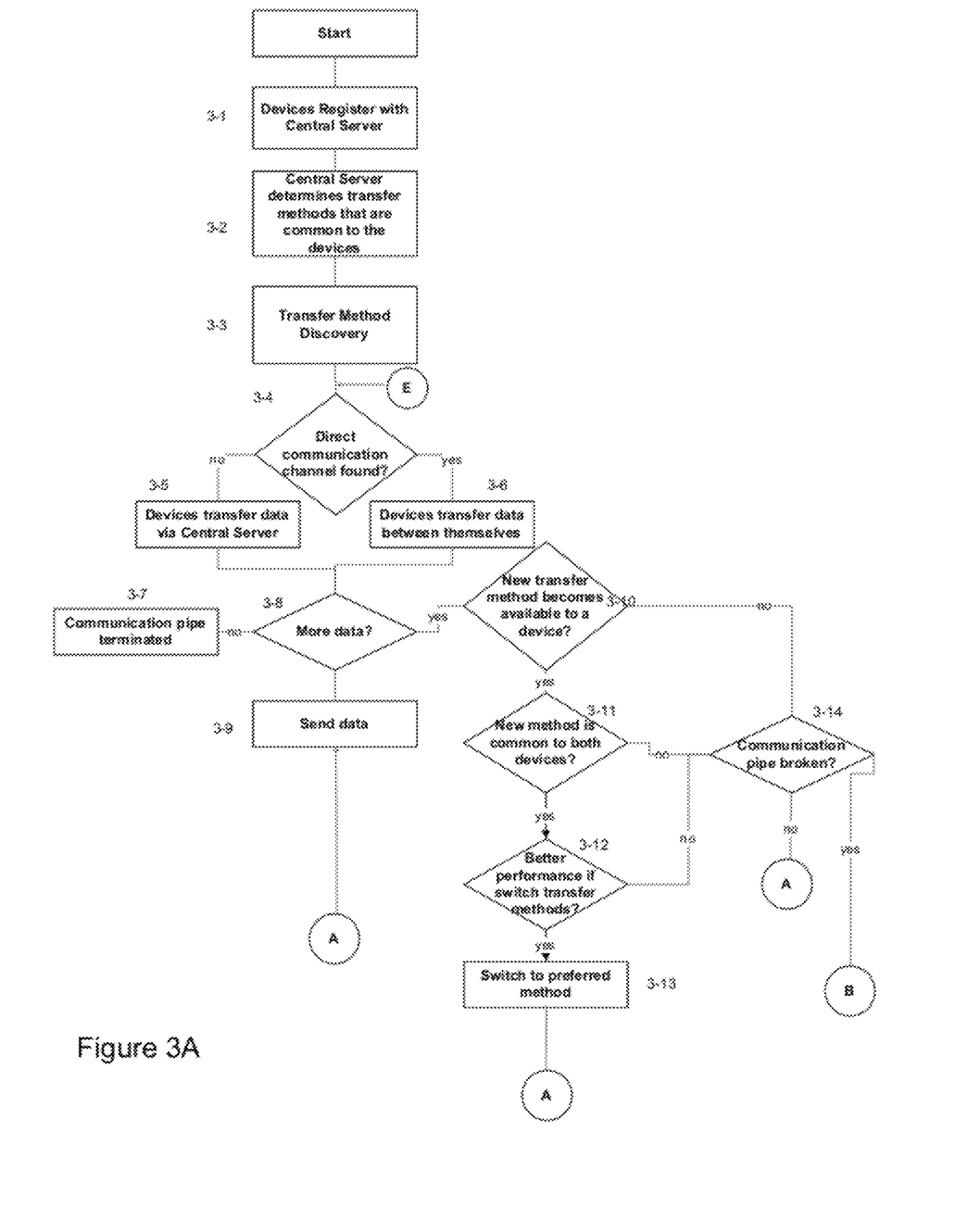
FIGS. 3A-3B are flowcharts of a communication application according to an exemplary embodiment of the invention.

In more detail, in step 3-1, smartphone 2 and projector 3 register with central server 6. Registration can occur either automatically by the devices themselves or a user can manually register the devices. As part of the registration process, smartphone 2 and projector 3 each provide central server 6 with the transfer (hereinafter referred to as "communication") methods that they respectively support. These communication methods can include, but are not limited to wireless, universal serial bus (USB), IEEE1394, etc.

In addition, smartphone 2 and projector 3 also provide central server 6 with additional information, including device identification information. The device identification information can include, but is not limited to, a unique device ID number, the device's IP address of the particular network the device is currently connected to, etc.

Next, in step 3-2, central server 6 determines communication methods are common to both smartphone 2 and projector 3. Once all of the common communication methods have been determined, central server 6 then prioritizes the communication methods. In one exemplary embodiment, central server 6 prioritizes the communication methods based on a pre-determined order set by a user. In another exemplary embodiment, central server 6 prioritizes the communication methods based on, for example, weighted factors such as security, quality, speed, etc of each of the communication methods. Prioritization of communication methods is not limited to the above provided examples and any approach that would enable practice of the present invention is applicable.

Figure 4A:
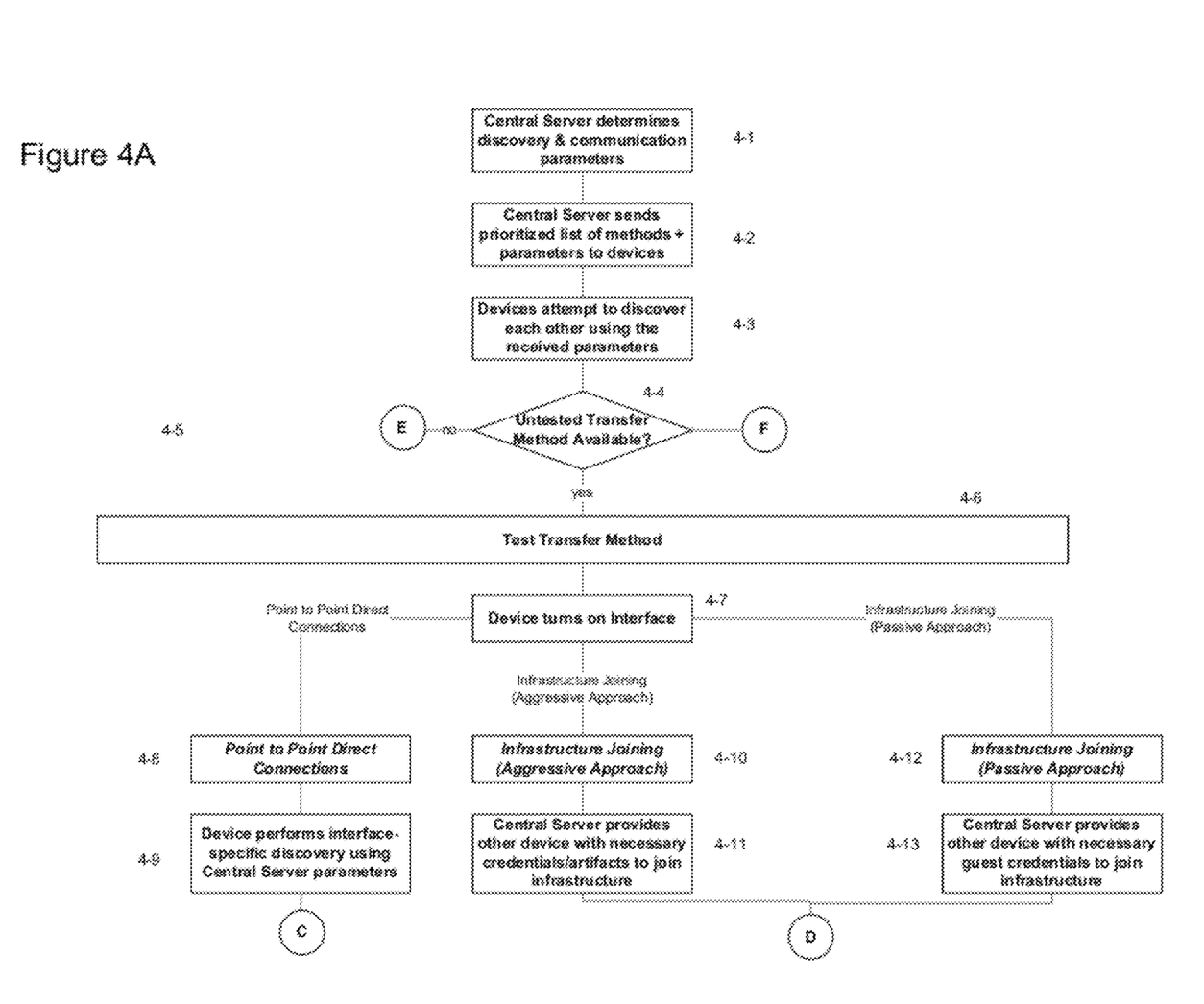
FIGS. 4A-4B are flowcharts of a communication application according to an exemplary embodiment of the invention.
Figure 4B:
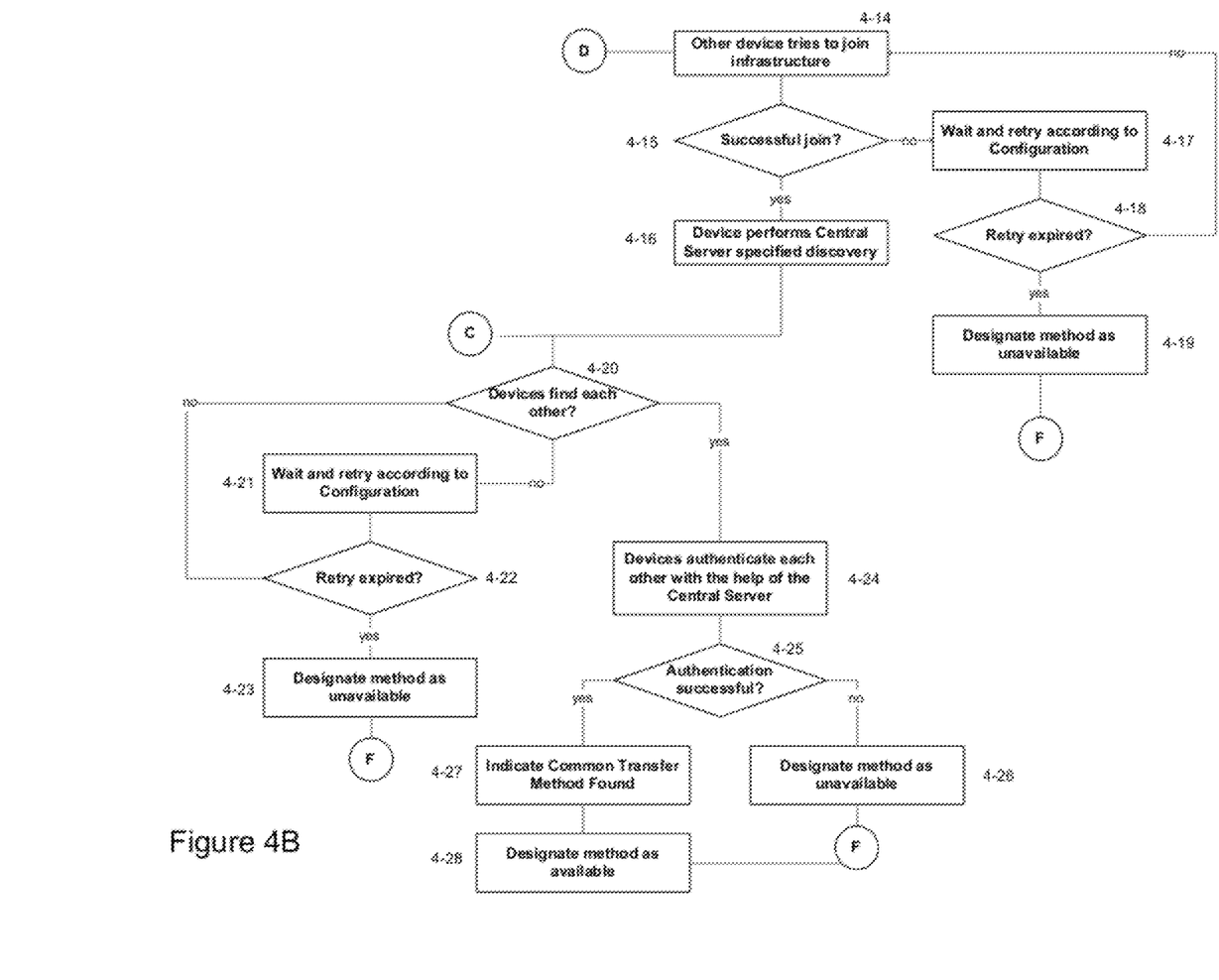

In step 3-3, a communication method discovery procedure is performed as described with respect to FIGS. 4A-4B. Briefly, central server 6 directs a device (smartphone 2) looking to initiate communication with another device (projector 3) to discover the communication method that would enable the two devices to communicate directly with each other, without the central server 6 acting as a go-between.

More specifically, turning to FIG. 4A, in step 4-1, central server 6 determines the communication parameters associated with each of the common communication methods determined in step 3-2. For example, in one exemplary embodiment, if the common communication method is Wi-Fi, then the particular Wi-Fi network's Service Set identifier (SSID) would be the communication parameter. In another exemplary embodiment, if the communication method is via a wired interface, the devices' data bit frequency (baud rate) is used as the communication parameter. In an exemplary embodiment, central server 6 can use a lookup table to determine the communication parameter(s) associated with a particular communication method. Any method, however, that would enable central server 6 to determine the communication parameter(s) associated with a particular communication method is applicable.

Next, in step 4-2, central server 6 sends a prioritized list of communication methods and their associated communication parameters to smartphone 2 and projector 3. Then, in step 4-3, smartphone 2 notifies the central server 6 that it wants to communicate with projector 3.

As part of the notification, smartphone 2 obtains identification information associated with projector 3 and provides it to central server 6. In an exemplary embodiment, smartphone 2 can obtain projector's 3 identification information by taking a photograph of a barcode label located on projector 3, where the barcode includes projector's 3 identification information. Smartphone 2 then transmits the photograph to central server 6, central server 6 analyzes the photograph, and then extracts projector's 4 identification information from the barcode. This is just one example of how smartphone 2 can obtain and provide projector's identification information to central server 6. The present invention is not limited to this method, and any method that would enable practice of the present invention is applicable.

Upon receipt of the device identification information, central server 6 determines whether projector 3 is registered with central server 6. In the event that projector 3 is not registered, central server 6 can, among other things, notify smartphone 2 that it cannot help establish communication with projector 3.

If projector 3 is registered with central server 6, then central server 6 proceeds to compare the communication methods that smartphone 2 supports with those that projector 3 supports, and provides smartphone 2 with a list of communication methods that are common to both smartphone 2 and projector 3.

Flow then proceeds to step 4-4, where smartphone 2 determines whether the communication methods provided in step 4-3 have been tested to determine if communication with projector 3 is possible using a particular communication method. If there are communication methods that require testing, flow proceeds to step 4-6. If there are no communication methods that require testing, flow proceeds to step 3-4 in FIG. 3A. In an exemplary embodiment, smartphone 2 would test all of the communication methods provided in step 4-3. In another exemplary embodiment, smartphone 2 would test a subset of the communications provided in step 4-3.

In step 4-6, smartphone 2 initiates the process of testing the communication methods. Testing of the communications methods is performed according to the prioritized list sent to smartphone 2 by central server 6 in step 4-2. In step 4-7, smartphone 2 turns on the particular communication interface associated with the communication method to be tested.

The following are exemplary examples of different communication methods that smartphone 2 can test. These examples are provided for description purposes, and any communication method that would enable practice of the present invention is applicable. The examples are discussed in no particular order. As described above, smartphone 2 will test the communication methods per the prioritized list provided by central server 6.

Step 4-8 is directed to a point-to-point direct connection between smartphone 2 and projector 3, such as, for example, but not limited to, Infrared, Bluetooth®, Ad Hoc Wi-Fi, USB, Serial, etc. In step 4-9, smartphone 2 initiates the test using the communication parameters provided by central server 6 for the particular communication method. Since any well-known communication method would enable practice of the present invention, the communication parameters for the particular communication are also well known, and thus a detailed description of the known communication parameters is omitted herein. If the particular communication method being tested requires central server 6 to interact with smartphone 2 and/or projector 3, then smartphone 2 will notify central server 6 that assistance is required. Flow then proceeds to step 4-20 described below.

Step 4-10 is directed to allowing projector 3 to join the infrastructure to which smartphone 2 already belongs. In step 4-11, central server 6 provides projector 3 with the necessary credentials needed for projector 3 to join the infrastructure as member. For example, for a Wi-Fi infrastructure, central server 6 provides projector 3 with the SSID and security password associated with the infrastructure. Then, in step 4-14, projector 3 attempts to join the infrastructure using the credentials provided in step 4-9.

Flow then proceeds to step 4-15, where a determination is made whether projector 3 successfully joined the infrastructure. If projector 3 fails to join the infrastructure, then in step 4-17, projector 3 waits a pre-determined period and then attempts to re-try joining the infrastructure using the provided credentials. Next, in step 4-18, if a predetermined number of re-tries has not yet been exceeded, flow returns to step 4-14. If, in step 4-18 the pre-determined number of retries has been exceeded, then in step 4-19, central server 6 designates the current communication method as unavailable, notifies smartphone 2 and projector 3 that this communication method is not available, and flow proceeds back to step 4-4.

If, in step 4-15, projector 3 successfully joins smartphone's 2 infrastructure, then in step 4-16, central server 6 coordinates the process for smartphone 2 and projector 3 to find each other. In one embodiment, once projector 3 successfully joins smartphone's 2 infrastructure, central server 6 designates an IP address and port that both smartphone 2 and projector 3 use to attempt to discover each other. Central server 6 also designates which device will send a discovery packet to the designated IP address and port and which device needs to listen for the discovery packet at the specified IP address and port. Flow then proceeds to step 4-20 described below.

Step 4-12 is directed to another method of allowing projector 3 to join the infrastructure that smartphone 2 is already a member of. In step 4-13, central server 6 provides projector 3 with the necessary credentials to join the infrastructure as a guest. For example, central server 6 provides the SSID and a guest security password associated with the infrastructure. Flow then proceeds to step 4-14, and the process as described above is performed.

Turning to step 4-20, smartphone 2 determines whether it was able to locate projector 3 using the currently selected communication method. If smartphone 2 was not able to locate projector 3, then in step 4-21, smartphone 2 waits a pre-determined period of time and then attempts to re-try using the same communication method. Next, in step 4-22, if a pre-determined number of re-tries has not yet been exceeded, flow returns to step 4-20. If, in step 4-22, the pre-determined number of retries has been exceeded, then in step 4-23, smartphone 2 designates the current communication method as unavailable, notifies the central server 6, and flow proceeds back to step 4-4 to determine whether there are any other communication methods that still need to be tested.

Returning to step 4-20, if smartphone 2 successfully locates projector 3, then in step 4-24, smartphone 2 and projector 3 authenticate themselves to each other with the help of central server 6. Any known authentication method enabling smartphone 2 and projector 3 to authenticate themselves to each other that would facilitate practice of the present invention is applicable. For example, central server 6 may act as a security key distribution center (KDC) and/or a security token service (STS) for smartphone 2 and projector 3. In this example, central server 6 would coordinate and manage exchange of security (encryption) keys and token lifetime, etc. Smartphone 2 and projector 3 could conduct a known challenge-response authentication procedure with each other using the security keys provided by central server 6, wherein assistance by central server 6 would not be required. In another example, central server 6 would process the challenges and responses.

Next, in step 4-25, a determination is made whether smartphone 2 and projector 3 have successfully authenticated themselves to each other. Any known method for confirming that two devices have authenticated themselves to each other is applicable, and thus, a detailed description is omitted herein.

If smartphone 2 and projector 3 successfully authenticate themselves to each other, then in step 4-27, smartphone 2 indicates that a communication method for communicating with projector 3 has been found. In step 4-28, smartphone 2 designates the current communication method as being available, notifies central server 6, and flow returns to step 4-4. If smartphone 2 and projector 3 have not successfully authenticated themselves to each other, then in step 4-26, smartphone 2 indicates the current communication method is unavailable, notifies central server 6, and flow returns to step 4-4.

If in step 4-4, there are additional communication methods to test, the above described process is repeated for the particular communication method being tested. If there are no more communication methods to be tested, then flow proceeds to step 3-4.

Returning to FIG. 3A, in step 3-4, smartphone 2 determines whether direct communication with projector 3 is available. The determination is based on whether at least one of the tested communication method was indicated as available, as described above. If direct communication is possible, then flow proceeds to step 3-6, where smartphone 2 and projector 3 begin to communicate/transfer data directly between themselves without central server 6 acting as a go-between. If direct communication is not possible, then flow proceeds to step 3-5, where smartphone 2 and projector 3 communicate/transfer data with each other via central server 6.

Regardless of whether smartphone 2 and projector 3 communicate directly with each other or via central server 6, in step 3-8, a determination is made whether all the data associated with a particular communication session has been transferred. If there is no more data to transfer, then in step 3-7 the current communication session is terminated. If however, there is still more data to transfer, flow proceeds to step 3-10.

In step 3-10, central server 6 checks whether any new communication methods not previously tested have become available to smartphone 2 or projector 3. In one embodiment, smartphone 2 and projector 3 notify central server 6 of any changes to the communication methods they support. For example, if smartphone 2 initially did not support a Bluetooth® interface and smartphone's 2 functionality was upgraded to support Bluetooth®, smartphone 2 would notify central server 6 that it now supports Bluetooth®. If central server 6 is notified that smartphone 2 and/or projector 3 support a new communication method(s), then in step 3-11, central server 6 determines whether the new communication method(s) is common/supported by both smartphone 2 and projector 3.

If in step 3-11, central server 6 determines that the new communication method(s) is common to/supported by both smartphone 2 and projector 3, then in step 3-12, central server 6 determines whether the new communication method (s) can provide better performance than the communication method currently used. Any known method for comparing performance of one communication method vs. another, e.g., bandwidth capability, etc., that would enable practice of the present invention is applicable, and thus, a detailed description thereof is omitted herein.

If a new communication method provides better performance than the current communication method, then in step 3-13, central server 6 instructs smartphone 2 and projector 3 to switch to using the new communication method. Flow then proceeds to step 3-9 as described below.

If there are no new communication methods (step 3-10), or none of the new communication methods are common to/supported by both smartphone 2 and projector 3 (step 3-11), or if there would be no performance improvement by switching to a new communication method (step 3-12), the process proceeds to step 3-14. In step 3-14, a check is performed to determine whether there are any problems with the current communication method. For example, either smartphone 2 or projector 3 may not be responding to messages sent by the other device. Any known method for detecting a communication error between devices that would enable practice of the present invention is applicable, and thus, a detailed description thereof is omitted herein. If there is no communication error, then flow proceeds to step 3-9 as described below. If there is a communication error, then the process proceeds to step 3-23.

Figure 3B:
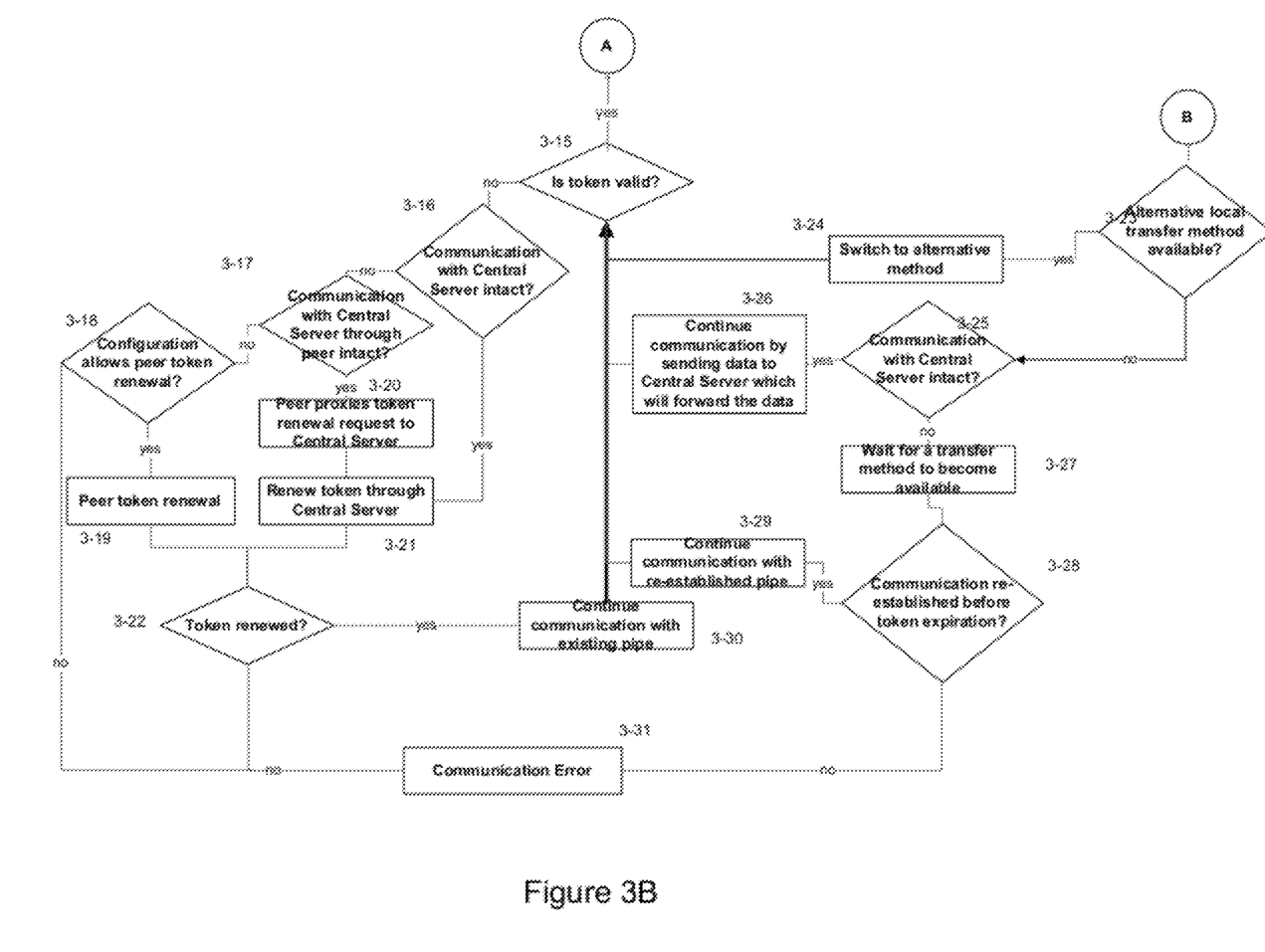

In step 3-23, smartphone 2 determines whether there are any other communication methods common to it and projector 3. If an alternative communication method exists, then in step 3-24, smartphone 2 and projector 3 begin using the alternative method. Determining which alternative communication method to use and establishment of communication between smartphone 2 and projector 3 is identical to the process described above with respect to FIGS. 4A and 4B. Flow then proceeds to step 3-15 described below.

If, in step 3-23, there is no alternative communication method available, then in step 3-25, smartphone 2 determines whether it can still communicate with central server 6. If smartphone 2 can still communicate with central server 6, then in step 3-26, central server 6 notifies smartphone 2 and projector 3 that it will act as go-between for data transfers between the two. Flow then proceeds to step 3-15 as described below.

If in step 3-25, smartphone 2 is unable to communicate with central server 6, then in step 3-27, smartphone 2 periodically performs the process described above with respect to FIGS. 4A and 4B. Next, in step 3-28, smartphone 2 determines whether it has been able to re-establish communication with projector 3 before a security token associated with the connection, as described in step 4-24, has expired.

If communication is re-established prior to expiration of the security token, then in step 3-29, communication with the projector 3 continues. Flow then proceeds to step 3-15. If communication has not been re-established prior to expiration of the security token, then in step 3-31, smartphone 2 notifies central server 6 that a communication error has occurred and the process ends.

Turning to step 3-15, smartphone 2 determines whether the security token, as described in step 4-24, is valid. If the security token is valid, then in step 3-9 data is transferred between smartphone 2 and projector 3, and flow proceeds to step 3-8 as described above.

If the security token is not valid, then in step 3-16, smartphone 2 checks whether communication with central server 6 is still intact. If smartphone 2 can still communicate with central server 6, then in step 3-21, central server 6 re-news the token using the same method as it used to set the token in step 4-24. Flow then proceeds to step 3-22 described below.

If smartphone 2 is unable to communicate with central server 6, then in step 3-17, smartphone attempts to communicate with central server 6 via projector 3. If smartphone 2 is unable to communicate with central server 6 via projector 3, then in step 3-18, projector 3 determines whether it is capable of renewing the token itself. If projector 3 can renew the token itself, then in step 3-19, projector 3 renews the token and flow proceeds to step 3-22 described below. If projector 3 cannot renew the token itself, then flow proceeds to step 3-31, where smartphone 2 reports a communication error and the process ends.

If, in step 3-17, smartphone 2 is able to communicate with central server 6 via projector 3, then in step 3-20, projector 3 sends a token renewal request to central server 6 on smartphone's 2 behalf. Then, in step 3-21, central server 6 renews the token. Flow then proceeds to step 3-22.

In step 3-22, smartphone 2 determines whether the token has been renewed. If the token has been renewed, then in step 3-30, smartphone 2 continues to communicate with projector 3, and flow returns to step 3-15. If the token has not been renewed, then in step 3-31, smartphone 2 reports a communication error and the process ends.

Aspects of the present invention can also be realized by a computer of a system or apparatus (or devices such as a CPU or a micro-processing unit (MPU)) that reads out and executes computer-executable instructions (referred to hereinafter as "a program") recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program may be provided to the computer for example via a network or from a recording medium of various types serving as the memory device (non-transitory computer-readable storage medium).

A wide variety of storage media may be used to store the program. The storage medium may be, for example, any of a flexible disk (floppy disk), a hard disk, an optical disk, a magneto-optical disk, a compact disc (CD), a digital versatile disc (DVD), a read only memory (ROM), a CD-recordable (R), a CD-rewritable, a DVD-recordable, a DVD-rewritable, a magnetic tape, a nonvolatile memory card, a flash memory device, a storage of distributed computing systems, and so forth. The storage medium may be a function expansion unit inserted in a computer.

As many apparently widely different embodiments of the present invention can be made without departing from the spirit and scope thereof, it is to be understood that the invention is not limited to the specific embodiments thereof except as defined in the appended claims.

While aspects of the present invention have been described with reference to exemplary embodiments, it is to be understood that the invention is not limited to the disclosed exemplary embodiments. The scope of the following claims is to be accorded the broadest interpretation so as to encompass all modifications, equivalent structures and functions.

What is claimed is:

1. A method for establishing communication between a plurality of devices, the method comprising:
   obtaining, by a separate server apparatus, information regarding communication protocols supported by each of the plurality of devices from the plurality of the devices connected to the separate server apparatus via a first communication interface;
   obtaining, by the separate server apparatus, information regarding communication protocols supported by each of the plurality of devices connected to the separate server apparatus via a communication interface different from the first communication interface;
   determining, by the separate server apparatus, a list of candidates for communication protocols common to the plurality of devices in accordance with the obtained information;
   determining, by the separate server apparatus, a list of candidates for operational parameters associated with each of the common communication protocols for each of the plurality of devices;
   sending, from the separate server apparatus to the plurality of the devices, information regarding the determined candidates for the common communication protocols and the determined candidates for associated operational parameters;
   determining, by the separate server apparatus, whether the plurality of devices can communicate with each other using the candidates for the common communication protocols and the candidates for the operational parameters;
   designating, by the separate server apparatus, the determined common communication protocols from the list of candidates and the corresponding operational parameters to be used by the plurality of the devices, wherein the determined common communication protocols and the corresponding operational parameters enable the plurality of the devices to initiate a connection therebetween;
   during a communication session between a first device of the plurality of devices and a second device of the plurality of devices using a first communication protocol, determining, by the separate server apparatus, that a second communication protocol is usable by the first device and the second device to communicate with each other, wherein the first communication protocol is one of the determined common communication protocols from the list of candidates and the second communication protocol is a new communication protocol for at least one of the first device and the second device; and
   sending, from the separate server apparatus to the first device and the second device during the communication session, an instruction to switch from the first communication protocol to the second communication protocol.

2. The method according to claim 1, wherein information regarding the determined candidates for the common communication protocols comprises information regarding a particular order in which the communication protocols are to be used.

3. The method according to claim 2, wherein determining whether the plurality of devices can communicate with each other using the candidates for common communication protocols is performed based on the particular order.

4. The method according to claim 2, wherein the particular order is based on a predetermined criterion.

5. The method according to claim 4, wherein the predetermined criteria is a communication protocol type.

6. The method according to claim 4, wherein the predetermined criteria is a highest common denominator value of an operational parameter associated with a communication protocol.

7. The method according to claim 1, further comprising:
   initiating data transfers directly between the plurality of devices upon establishing communication between the plurality of devices.

8. The method according to claim 1, wherein the determining that the second communication protocol is usable by the first device and the second device to communicate with each other includes:
   determining whether one or more new communication protocols are available to one or more of the plurality of the devices; and
   in response to determining that one or more new communication protocols are available, obtaining information regarding the one or more new communication protocols, wherein the one or more new communication protocols include the second communication protocol.

9. The method according to claim 8, wherein the determining that the second communication protocol is usable by the first device and the second device to communicate with each other includes:
   determining that the second communication protocol is common to at least the first device and the second device.

10. The method according to claim 1, further comprising:
    determining that the second communication protocol can provide better communication performance than the first communication protocol,
    wherein the instruction to switch from the first communication protocol to the second communication protocol is based at least in part on the determination that the second communication protocol can provide better communication performance than the first communication protocol.

11. A computer-readable storage medium storing computer-executable process steps for causing a computer to carry out the method of claim 1.

12. The method according to claim 1, further comprising:
    establishing communication between the plurality of devices using at least one of the common communication protocols that it was determined the plurality of devices can communicate with.

13. The method according to claim 12, wherein the plurality of devices share credential information necessary via the separate server apparatus to join a local communication infrastructure that one of the plurality of devices belongs to.

14. The method according to claim 12, wherein the plurality of devices perform steps to use the specified candidate communication protocols in accordance with the operational parameters to establish direct communication among devices.

15. The method according to claim 13, wherein the separate server apparatus is configured to share guest and member credential information with which to join the local communication infrastructure.

\* \* \* \* \*